United States Patent
Wang

(10) Patent No.: US 12,287,668 B2
(45) Date of Patent: Apr. 29, 2025

(54) FRAME STRUCTURE OF DUAL SCREEN EXTENDER AND SCREEN EXTENDER

(71) Applicant: SHENZHEN BAIJIAYOUPU TECHNOLOGY CO., LTD., Shenzhen (CN)

(72) Inventor: Xiaogang Wang, Shenzhen (CN)

(73) Assignee: SHENZHEN BAIJIAYOUPU TECHNOLOGY CO., LTD., Shenzhen (CN)

(*) Notice: Subject to any disclaimer, the term of this patent is extended or adjusted under 35 U.S.C. 154(b) by 246 days.

(21) Appl. No.: 18/140,596

(22) Filed: Apr. 27, 2023

(65) Prior Publication Data

US 2023/0266792 A1 Aug. 24, 2023

Related U.S. Application Data

(63) Continuation of application No. PCT/CN2021/093835, filed on May 14, 2021.

(51) Int. Cl.
*G06F 1/16* (2006.01)
*F16M 11/06* (2006.01)
(52) U.S. Cl.
CPC .......... *G06F 1/1607* (2013.01); *F16M 11/06* (2013.01); *G06F 1/1647* (2013.01)
(58) Field of Classification Search
CPC .... G06F 1/1607; G06F 1/1632; G06F 1/1647; G06F 1/1654; G06F 1/1679
See application file for complete search history.

(56) References Cited

U.S. PATENT DOCUMENTS 5,035,392 A * 7/1991 Gross ................. B41J 29/15
248/442.2
5,052,199 A * 10/1991 Derman ............. E05B 73/0082
70/58

(Continued)

FOREIGN PATENT DOCUMENTS

CN 203038582 U 7/2013
CN 106339040 A 1/2017

(Continued)

OTHER PUBLICATIONS

International Search Report issued in corresponding International application No. PCT/CN2021/093835, mailed Feb. 10, 2022.

(Continued)

*Primary Examiner* — Adrian S Wilson

(57) ABSTRACT

A frame structure of a dual screen extender includes a support body. Two clamping portions are slidably arranged on two sides of the support body. Sliding rods are arranged on the clamping portions. Sliding channels are formed on the support body. The sliding channels are matched with the sliding rods. An elastic tensioning piece is arranged in each of the sliding channels. Each elastic tensioning piece is configured to provide elastic tensioning force for a corresponding sliding rod. At least one of the two clamping portions is provided with a screen support. The screen support is rotatable. The screen support is stacked on the support body when the screen support is rotated to be fully folded. A state maintaining assembly is arranged on each of the clamping portions. Each state maintaining assembly is configured to position the screen support before and after rotation of the screen support.

10 Claims, 4 Drawing Sheets

(56) References Cited

U.S. PATENT DOCUMENTS

| | | | | |
|---|---|---|---|---|
| D360,126 S * | 7/1995 | Rosen | | D8/349 |
| D461,190 S * | 8/2002 | Bell | | D14/448 |
| 6,532,146 B1 * | 3/2003 | Duquette | | G06F 1/1607 |
| | | | | 361/679.04 |
| 6,581,420 B1 * | 6/2003 | Ling | | G06F 1/1632 |
| | | | | 361/679.56 |
| 6,794,798 B2 * | 9/2004 | Watanabe | | H04R 5/02 |
| | | | | 310/334 |
| 7,274,564 B2 * | 9/2007 | Rossini | | G06F 1/1601 |
| | | | | 248/920 |
| 7,283,353 B1 * | 10/2007 | Jordan | | H04N 5/64 |
| | | | | 345/1.3 |
| D621,407 S * | 8/2010 | Simonsen | | D14/448 |
| D630,204 S * | 1/2011 | Kovac | | D14/327 |
| D652,832 S * | 1/2012 | Wu | | D14/373 |
| 8,102,331 B1 | 1/2012 | Moscovitch | | |
| 8,317,146 B2 * | 11/2012 | Jung | | G06F 1/1601 |
| | | | | 361/679.04 |
| 8,783,073 B1 * | 7/2014 | Derman | | E05B 73/0005 |
| | | | | 70/57 |
| D771,052 S * | 11/2016 | Zheng | | D14/434 |
| 9,568,141 B1 * | 2/2017 | Zaloom | | F16M 13/00 |
| D938,436 S * | 12/2021 | Gu | | D14/448 |
| D1,037,261 S * | 7/2024 | Wang | | D14/448 |
| 2005/0253775 A1 * | 11/2005 | Stewart | | G06F 1/1616 |
| | | | | 345/1.1 |
| 2006/0082518 A1 * | 4/2006 | Ram | | G06F 1/1675 |
| | | | | 345/1.1 |
| 2010/0079285 A1 * | 4/2010 | Fawcett | | E05B 73/0082 |
| | | | | 70/57.1 |
| 2012/0127651 A1 * | 5/2012 | Kwon | | G06F 21/88 |
| | | | | 361/679.43 |
| 2012/0175474 A1 * | 7/2012 | Barnard | | F16M 11/14 |
| | | | | 248/122.1 |
| 2012/0326003 A1 * | 12/2012 | Solow | | F16M 11/041 |
| | | | | 248/688 |
| 2013/0277520 A1 * | 10/2013 | Funk | | G06F 1/1626 |
| | | | | 248/274.1 |
| 2014/0060218 A1 * | 3/2014 | Bisesti | | F16M 11/04 |
| | | | | 248/274.1 |
| 2015/0083885 A1 * | 3/2015 | Mahaffey | | F16M 11/2007 |
| | | | | 248/551 |
| 2020/0278722 A1 * | 9/2020 | Hudgins | | H05K 5/0247 |

FOREIGN PATENT DOCUMENTS

| | | |
|---|---|---|
| CN | 110083198 A | 8/2019 |
| CN | 211853466 U | 11/2020 |

OTHER PUBLICATIONS

Written Opinion of the International Search Authority in corresponding International application No. PCT/CN2021/093835.

* cited by examiner

FRAME STRUCTURE OF DUAL SCREEN EXTENDER AND SCREEN EXTENDER

TECHNICAL FIELD

The present disclosure relates to a technical field of screen extenders, and in particular to a frame structure of a dual screen extender and a screen extender.

BACKGROUND

Screen extender is a peripheral screen to expand or copy a display screen of a laptop or a display screen of a desktop, so as to solve a problem of inconvenience of using a single screen. For example, most laptop displays are relatively small (commonly sized at 14 inches or 15.6 inches). When a laptop works, if a plurality of tables or a plurality of files need to be displayed at the same time, it is difficult to display all the files on one screen. Therefore, the screen extender is introduced to solve the problem mentioned above.

At present, conventional screen extenders on the market are divided into screen extenders hanging on a computer display and screen extenders individually arranged on one side of the computer display. The screen extenders hanging on the computer display are portable and lightweight because the screen extenders hanging on the computer display do not need a separate stand or only need a small stand for mounting. The screen extenders hanging on the computer display are suitable for laptops, and the laptops need the screen extenders more than the desktops.

However, a current screen extender for a display of the laptop is mainly a connecting frame connected to a rear side of the laptop through 3M adhesive, magnets, or other connecting structures, and an additional display is openable on the connecting frame, so that a user is able to use the display of the laptop and the additional display at the same time. However, the connecting frame connected by the magnets or the 3M adhesive is hardly being removed, resulting in a poor use effect.

SUMMARY

A technical problem to be solved by the present disclosure is to provide a frame structure of a dual screen extender and a screen extender to solve the defects in the prior art.

The present disclosure provides the frame structure of the dual screen extender. The frame structure of the dual screen extender comprises a support body. Two clamping portions are slidably arranged on two sides of the support body. Sliding rods are arranged on the clamping portions. Sliding channels are formed on the support body. The sliding channels are matched with the sliding rods. An elastic tensioning piece is arranged in each of the sliding channels. Each elastic tensioning piece is configured to provide elastic tensioning force for a corresponding sliding rod. At least one of the two clamping portions is provided with a screen support. The screen support is rotatable. The screen support is stacked on the support body when the screen support is rotated to be fully folded. A state maintaining assembly is arranged on each of the clamping portions. Each state maintaining assembly is configured to position the screen support before and after rotation of the screen support.

In the frame structure of the dual screen extender of the present disclosure, two protecting frames are arranged on the support body. The two protecting frames and the support body enclose to define a concave area. The concave area is configured to protect the screen support in a folded state.

In the frame structure of the dual screen extender of the present disclosure, the sliding rods are arranged on two sides of one end of each of the clamping portions close to the support body. The sliding channels defined on the support body are one-to-one corresponding to the sliding rods.

In the frame structure of the dual screen extender of the present disclosure, each two sliding channels corresponding to a same clamping portion are respectively arranged on the two protecting frames.

In the frame structure of the dual screen extender of the present disclosure, each of the sliding channels is a hole defined on a corresponding end of each of the protecting frames. Each elastic tensioning piece is a spring or an elastic rope and is arranged at an inner bottom portion of each of the sliding channels.

In the frame structure of the dual screen extender of the present disclosure, two screen supports are arranged on the two clamping portions.

In the frame structure of the dual screen extender of the present disclosure, when the two screen supports are rotated to be fully folded, the two screen supports are arranged on a same side of the support body. A distance from a first screen support to the support body is different with a distance from a second screen support to the support body.

In the frame structure of the dual screen extender of the present disclosure, each state maintaining assembly is a damping unit configured to provide a damping force for the rotation of the screen support, or each state maintaining assembly is a force applying unit configured to apply pressure, tension or support force to the screen support after rotating.

In the frame structure of the dual screen extender of the present disclosure, one or more clamping blocks are arranged on each of the clamping portions. A friction pad configured to increase friction is arranged on each of the clamping blocks.

The present disclosure further provides the screen extender. The screen extender comprises the frame structure of the dual screen extender mentioned above.

In the frame structure of the dual screen extender of the present disclosure, the screen supports are firstly rotated to open the screen supports, and each state maintaining assembly is configured to limit a position of a corresponding screen support of the screen supports after the screen supports are rotated to desired positions. Then the support body is placed to a rear side of a display, and the two clamping portions are pulled out to clamp two sides of the display. The sliding rods, the sliding channels, and elastic tensioning pieces cooperate to provide pulling force to the two clamping portions, so as to complete assembly of the frame structure. The above process is reversed to quickly disassemble the frame structure. Thus, the frame structure is very convenient to disassemble and assemble. At the same time, the sliding rods, the sliding channels, and the elastic tensioning pieces provide elastic force for each of the clamping portions, so there are two different force points on the support body, which ensures stability and balance of the support body. In addition, the clamping portions still clamp the display even the sliding rods, the sliding channels, and the elastic tensioning pieces arranged on one side of the frame structure have mechanical failure, which extends service life of the frame structure

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
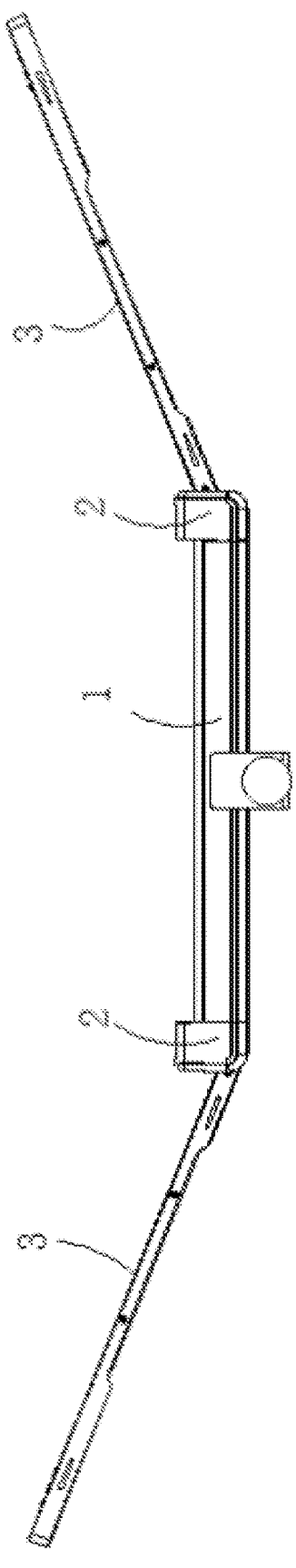
FIG. 1 is a top plan schematic diagram of a frame structure of a dual screen extender according to one optional embodiment of the present disclosure where screen supports are in an open state.
Figure 2:
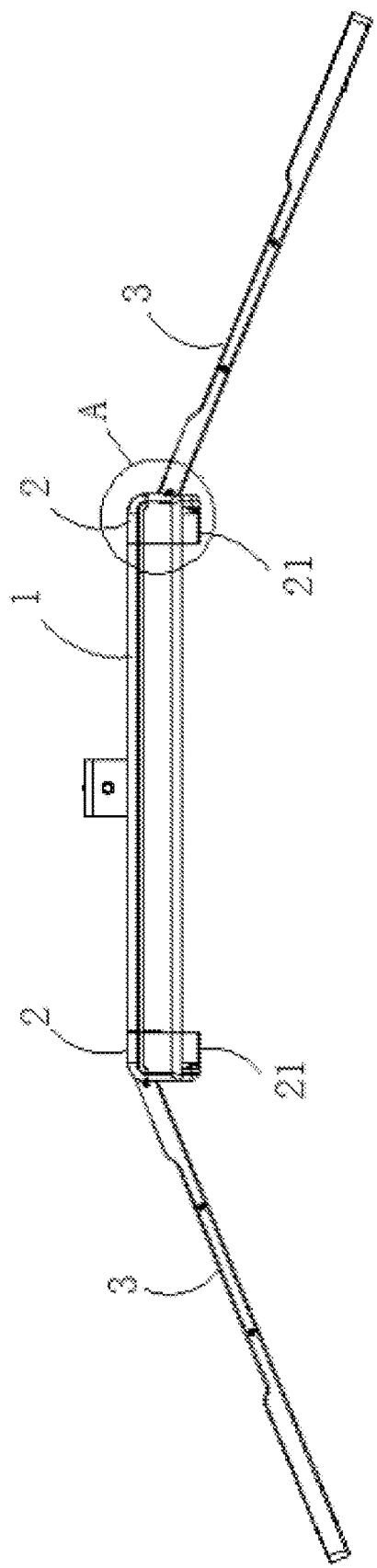
FIG. 2 is a bottom plan schematic diagram of the frame structure of the dual screen extender according to one optional embodiment of the present disclosure where screen supports are in the open state.
Figure 3:
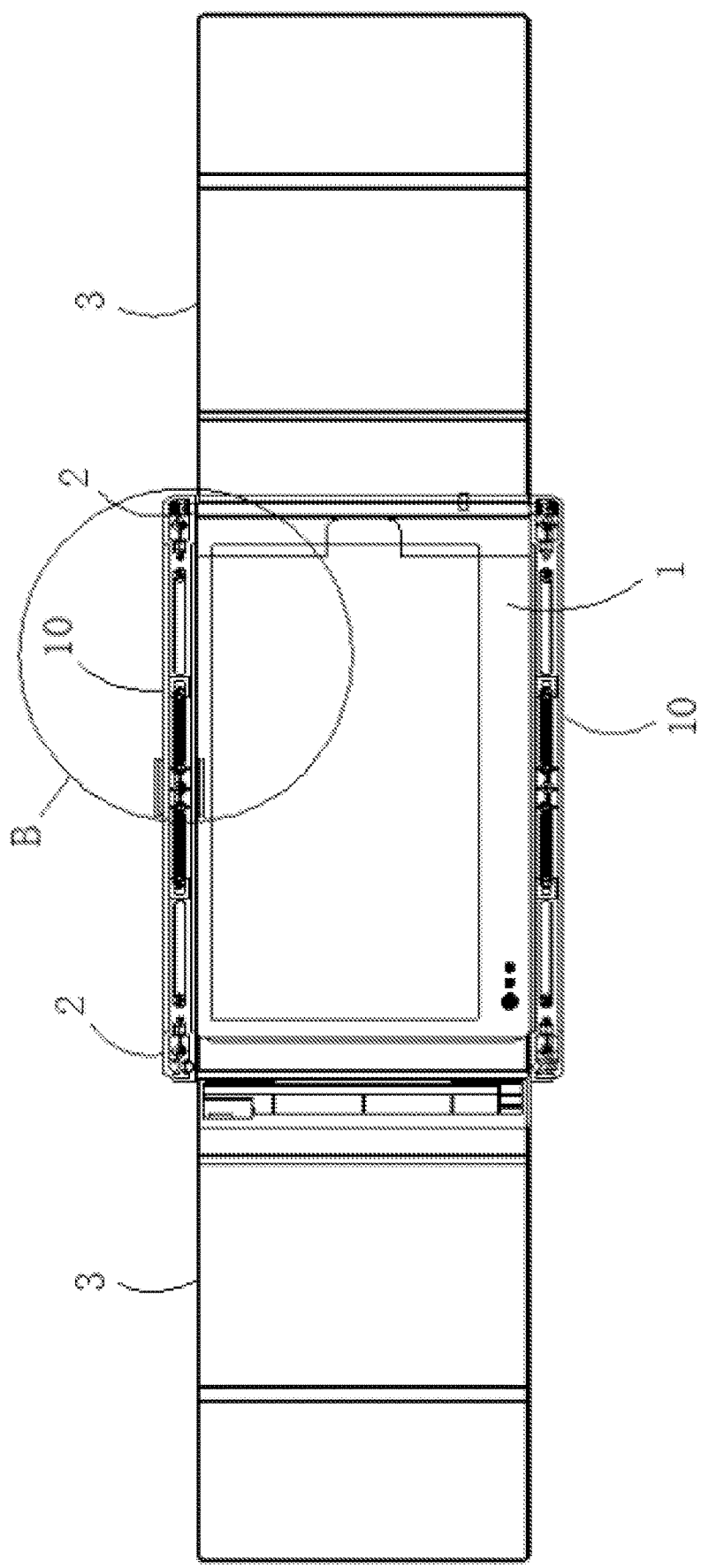
FIG. 3 is a cross-sectional schematic diagram of the frame structure of the dual screen extender according to one optional embodiment of the present disclosure where screen supports are in the open state.
Figure 4:
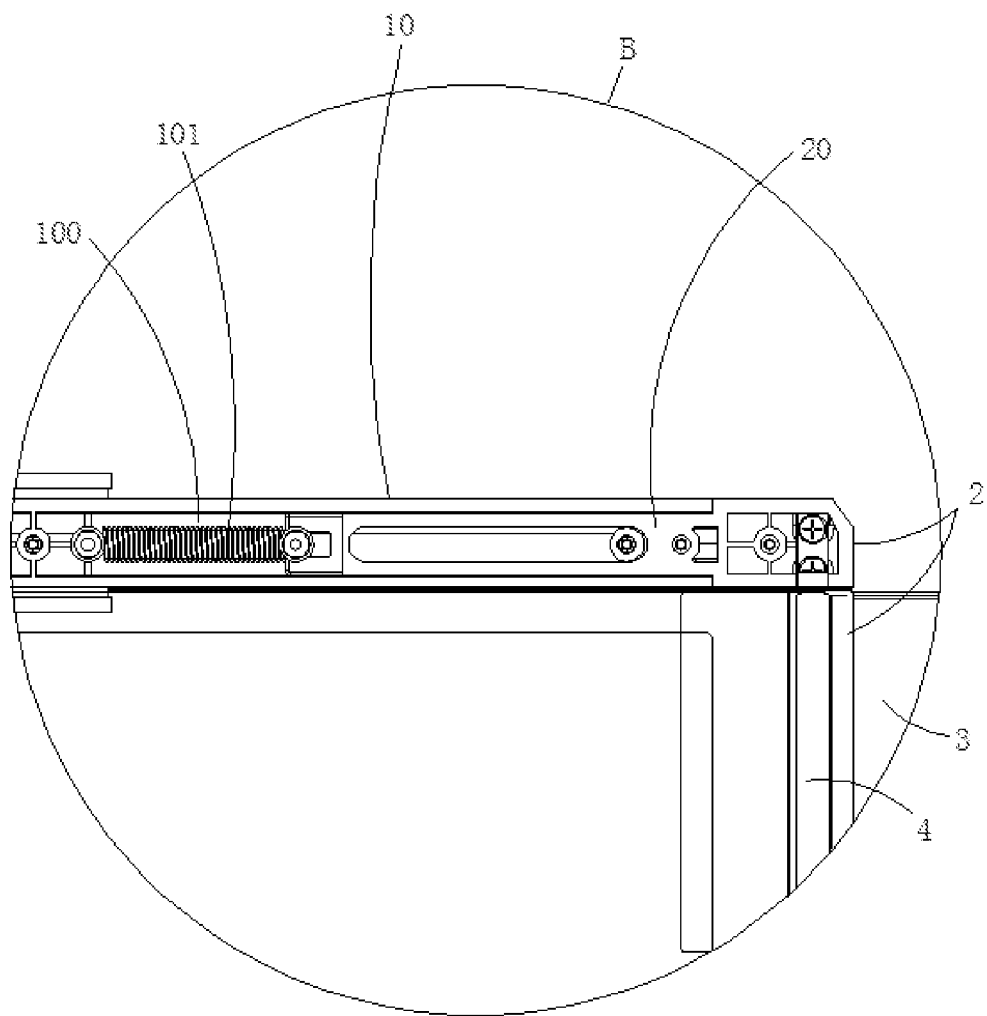
FIG. 4 is an enlarged schematic diagram of a sliding rod, a sling channel, and an elastic tensioning piece of the frame structure of the dual screen extender according to one optional embodiment of the present disclosure.
Figure 5:
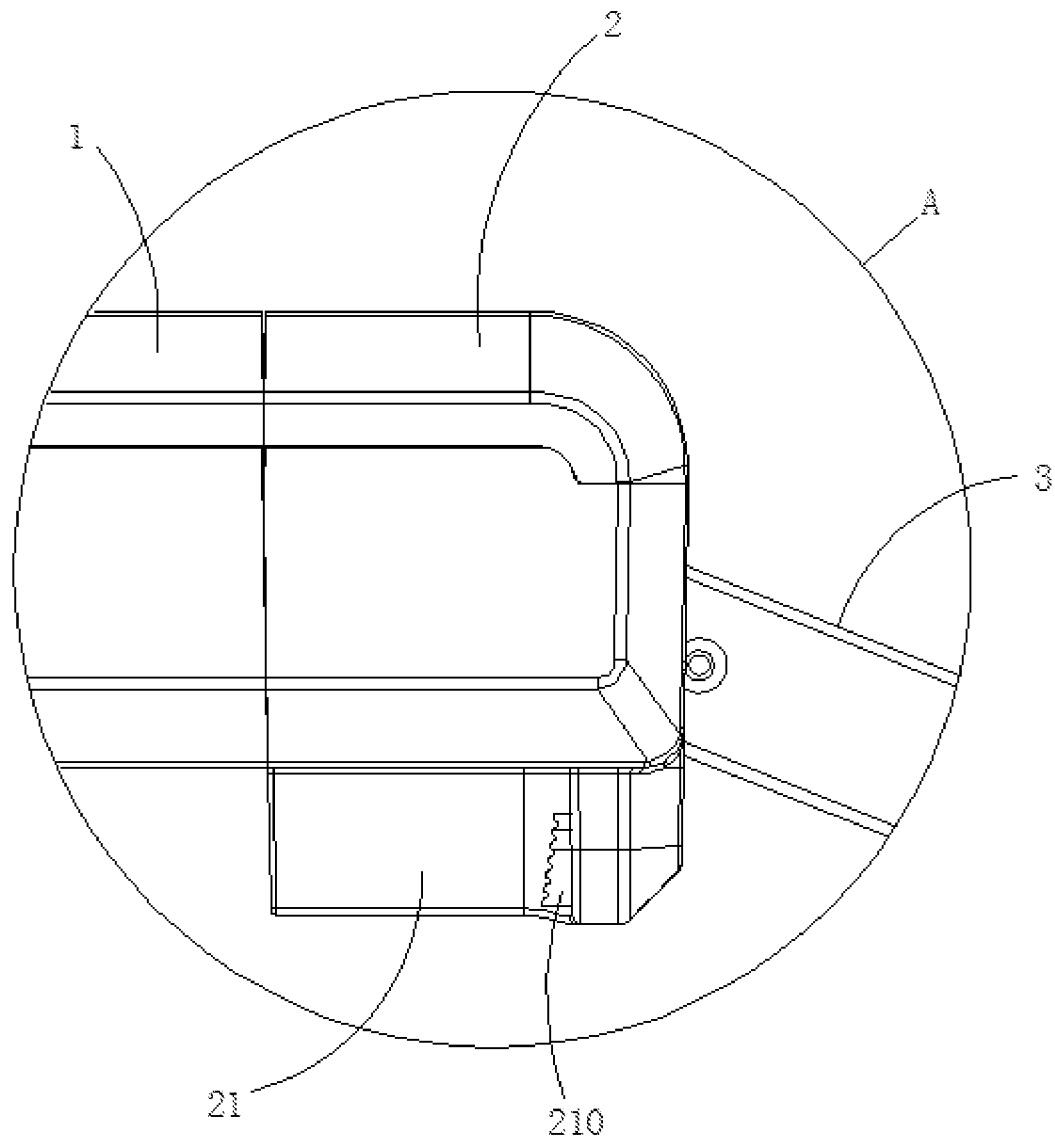
FIG. 5 is an enlarged schematic diagram of a clamping block of the frame structure of the dual screen extender according to one optional embodiment of the present disclosure.

One optional embodiment of the present disclosure provides a frame structure of a dual screen extender as shown in FIGS. 1-5. The frame structure of the dual screen extender comprises a support body 1. Two clamping portions 2 are slidably arranged on two sides of the support body 1. Sliding rods 20 are arranged on the clamping portions 2. Sliding channels 100 are formed on the support body 1. The sliding channels are matched with the sliding rods. An elastic tensioning piece 101 is arranged in each of the sliding channels 100. Each elastic tensioning piece 101 is configured to provide elastic tensioning force for a corresponding sliding rod 20. At least one of the two clamping portions 2 is provided with a screen support 3. The screen support 3 is rotatable. The screen support 3 is stacked on the support body 1 when the screen support 3 is rotated to be fully folded. A state maintaining assembly 4 is arranged on each of the clamping portions 2. Each state maintaining assembly 4 is configured to position the screen support 3 before and after rotation of the screen support 3.

In the frame structure of the dual screen extender of the present disclosure, the screen support 3 is firstly rotated to open the screen support 3, and a corresponding state maintaining assembly 4 limits a position of the screen support after the screen support 3 is rotated to a desired position. Then the support body 1 is placed to a rear side of a display, and the two clamping portions 2 are pulled out to clamp two sides of the display. The sliding rods 20, the sliding channels 100, and elastic tensioning pieces 101 cooperate to provide pulling force to the two clamping portions 2, so as to complete assembly of the frame structure of the dual screen extender. The above process is reversed to quickly disassemble the frame structure of the dual screen extender. Thus, the frame structure of the dual screen extender is very convenient to disassemble and assemble. Meanwhile, the sliding rods 20, the sliding channels 100, and the elastic tensioning pieces 101 provide elastic force for each of the clamping portions, so there are two different force points on the support body 1, which ensures stability and balance of the support body. In addition, the clamping portions 2 still clamp the display even the sliding rods, the sliding channels, and the elastic tensioning pieces arranged on one side of the frame structure of the dual screen extender have mechanical failure, which extends service life of the frame structure of the dual screen extender Optionally, two protecting frames 10 are arranged on the support body 1. The two protecting frames 10 and the support body 1 enclose to define a concave area. The concave area is configured to protect the screen support 3 in a folded state. Therefore, when the screen support 3 is rotated to the folded state, the screen support 3 is protected by the concave area enclosed by the two protecting frames 10 and the support body 1, thus protecting the additional display mounted on the screen support 3.

Optionally, the sliding rods 20 are arranged on two sides of one end of each of the clamping portions 2 close to the support body 1. The sliding channels 100 defined on the support body 1 are one-to-one corresponding to the sliding rods 20. Clamping stability of the clamping portions 2 is guaranteed by the sliding rods and the sliding channels 100.

Optionally, each two sliding channels 100 corresponding to a same clamping portion are respectively arranged on the two protecting frames. By such arrangements, the protecting frames 10 protect the frame structure of the dual screen extender while providing setting space of the sliding channels 100, which ensures integrity of the frame structure of the dual screen extender and improves an aesthetic appearance of the frame structure of the dual screen extender, thereby enhancing market competitiveness of the frame structure of the dual screen extender.

Optionally, each of the sliding channels 100 is a hole defined on a corresponding end of each of the protecting frames 10. Each elastic tensioning piece 101 is a spring or an elastic rope and is arranged at an inner bottom portion of each of the sliding channels 100. The sliding channels have reasonable and compact structures and have low cost in production. Further, sliding and resetting of the sliding channels is not affected by the outside world, and the frame structure of the dual screen extender is easy to assemble and has good reliability.

Optionally, two screen supports 3 are arranged on the two clamping portions 2. Therefore, the two screen supports are rotated and opened from two different directions for extending of a display screen.

Optionally, when the two screen supports 3 are rotated to be fully folded, the two screen supports 3 are arranged on a same side of the support body 1. A distance from a first screen support 3 to the support body 1 is different with a distance from a second screen support 3 to the support body 1. By staggering the two screen supports 3 and rotating the two screen supports 3 to the same side of the support body when the screen supports are fully folded, the frame structure of the dual screen extender has good integrity when the frame structure of the dual screen extender is folded for storage, and a volume of the frame structure of the dual screen extender fully folded is small.

Optionally, each state maintaining assembly 4 is a damping unit configured to provide a damping force for the rotation of a corresponding screen support 3, or each state maintaining assembly 4 is a force applying unit configured to apply pressure, tension or support force to the corresponding screen support after rotating.

In one optional embodiment, each state maintaining assembly 4 is a damping shaft. Each state maintaining assembly 4 provides a damping force to the corresponding screen support 3 to limit the position of the corresponding screen support after rotation.

Of course, other ways can be applied to limit the positions of the screen supports 3. For example, tightening screws are applied to provide tightening forces on the screen supports 3. Before and after the rotation of the screen supports 3, by tightening or loosening the tightening screws, the positions of the screen supports 3 are limited. Alternatively, grooves are defines on each of the screen supports and the grooves are corresponding to different positions of the screen supports 3, by snapping a snap on a corresponding groove of each of the screen supports, a position of each of the screen supports 3 is limited. Of course, there can be other existing ways of simple replacement of limiting ways of the screen supports, based on the principle of the screen supports, any simple replacement should fall within the protection scope of the present disclosure.

Optionally, one or more clamping blocks 21 are arranged on each of the clamping portions 2. A friction pad 210 configured to increase friction is arranged on each of the clamping blocks 21. Each friction pad 210 is configured to improve reliability of clamping. A shape of each of the clamping blocks 21 can be set according to needs. Optionally, each of the clamping blocks 21 is L-shaped or C-shaped, which provides a certain positioning effect and hanging tension when clamping.

Friction patterns may be arranged on each friction pad 210 to increase friction according to the needs.

The present disclosure further provides a screen extender. The screen extender comprises the frame structure of the dual screen extender mentioned above.

It should be understood that for those of ordinary skill in the art, improvements or transformations may be made in accordance with the above description, and all such improvements and transformations shall fall within the protection scope of the present disclosure.

What is claimed is:

1. A frame structure of a dual screen extender, comprising: a support body; wherein two clamping portions are slidably arranged on two sides of the support body; sliding rods are arranged on the clamping portions; sliding channels are formed on the support body; the sliding channels are matched with the sliding rods; an elastic tensioning piece is arranged in each of the sliding channels; each elastic tensioning piece is configured to provide elastic tensioning force for a corresponding sliding rod of the sliding rods; at least one of the two clamping portions is provided with a screen support; the screen support is rotatable; the screen support is stacked on the support body when the screen support is rotated to be fully folded; a state maintaining assembly is arranged on each of the clamping portions; each state maintaining assembly is configured to position the screen support before and after rotation of the screen support.

2. The frame structure of the dual screen extender according to claim 1, wherein two protecting frames are arranged on the support body; the two protecting frames and the support body enclose to define a concave area; the concave area is configured to protect the screen support in a folded state.

3. The frame structure of the dual screen extender according to claim 2, wherein the sliding rods are arranged on two sides of one end of each of the clamping portions close to the support body; the sliding channels defined on the support body are one-to-one corresponding to the sliding rods.

4. The frame structure of the dual screen extender according to claim 3, wherein each two sliding channels corresponding to a same clamping portion are respectively arranged on the two protecting frames.

5. The frame structure of the dual screen extender according to claim 2, wherein each of the sliding channels is a hole defined on a corresponding end of each of the protecting frames; each elastic tensioning piece is a spring or an elastic rope and is arranged at an inner bottom portion of each of the sliding channels.

6. The frame structure of the dual screen extender according to claim 1, wherein two screen supports are arranged on the two clamping portions.

7. The frame structure of the dual screen extender according to claim 6, wherein when the two screen supports are rotated to be fully folded, the two screen supports are arranged on a same side of the support body; a distance from a first screen support to the support body is different with a distance from a second screen support to the support body.

8. The frame structure of the dual screen extender according to claim 1, wherein each state maintaining assembly is a damping unit configured to provide a damping force for the rotation of the screen support, or each state maintaining assembly is a force applying unit configured to apply pressure, tension, or support force to the screen support after rotating.

9. The frame structure of the dual screen extender according to claim 1, wherein one or more clamping blocks are arranged on each of the clamping portions; a friction pad configured to increase friction is arranged on each of the clamping blocks.

10. A screen extender, comprising: the frame structure of the dual screen extender according to claim 1.

\* \* \* \* \*